J. F. LAMBERT.
LICENSE TAG HOLDER.
APPLICATION FILED DEC. 26, 1916.
1,230,176.
Patented June 19, 1917.
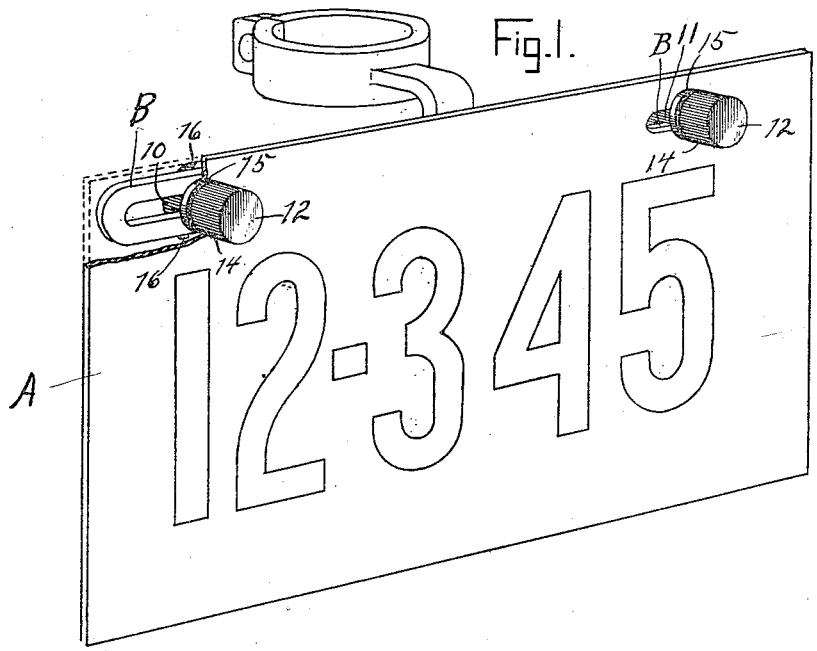
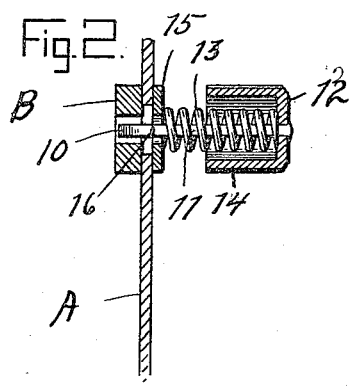
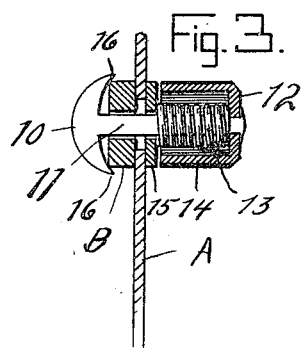
INVENTOR
James Frank Lambert
BY
C. W. Fairbanks
ATTORNEY

UNITED STATES PATENT OFFICE.

JAMES FRANK LAMBERT, OF PITTSBURGH, PENNSYLVANIA.

LICENSE-TAG HOLDER.

1,230,176. Specification of Letters Patent. Patented June 19, 1917.

Application filed December 26, 1916. Serial No. 138,825.

*To all whom it may concern:*

Be it known that I, JAMES FRANK LAMBERT, a citizen of the United States, and a resident of Pittsburgh, in the county of Allegheny and State of Pennsylvania, have invented certain new and useful Improvements in License-Tag Holders, of which the following is a specification.

My invention is a holder or clamping device particularly adapted for securing an automobile license number plate to its supporting bracket. By means of my invention the tag may be firmly and securely held in place, prevented from jarring loose or rattling, and may be easily taken off or put on without the use of any tools. The tag is also permitted to move to a slight extent relatively to the bracket under the influence of any blow or sudden strain, but without bending either the tag itself or supporting bracket.

My improved device in its preferred form includes two relatively movable members presenting opposed clamping surfaces and pressed toward each other by a spring. One of the members is so formed that it may be projected through registering openings in the license number plate and the supporting bracket and rotated to such a position that a return movement is prevented, while the other member may serve as an operating handle and as a housing for the spring.

In the accompanying drawings to which reference is to be had, I have illustrated merely one embodiment of my invention but I wish it understood that I am not to be limited in my protection to this specific form as various changes may be made within the scope of my invention as defined in the appended claims. In these drawings, Figure 1 is a perspective view of one form of license number plate and supporting bracket held together by means of my improved device;

Fig. 2 is a vertical, central, longitudinal section through the device and the parts to be clamped, the device being inserted partly through the registering openings, and Fig. 3 is a view similar to Fig. 2 but showing the device in final or clamping position.

The specific form illustrated includes an anchor member comprising a head 10 and a shank 11. This may be cut or stamped from a sheet of metal of sufficient thickness to give the parts the required strength. The length of the head 10 is not greater than the length of the slot, two of which are usually provided adjacent to the upper edge of most automobile license number plates.

At the end of the shank opposite to the head is a handle member 12 by means of which the anchor member may be placed in or removed from operative position. This member 12 may have an end wall receiving the end of the shank 11 and riveted or otherwise rigidly secured to the latter so that the said end wall may also serve as a seat for a spring 13 encircling the shank intermediate of the ends of the latter. The member 12 may also have a peripheral wall 14 serving as a casing to receive and partly conceal and protect the spring 13 and to also present a surface preferably roughened or knurled, which may be readily grasped while applying or removing the device.

Encircling the shank 11 is a washer 15 preferably of a diameter greater than the width of the slot in the license plate so that it may engage with the surface of the plate when the anchor head 10 is forced through the slot. The spring 13 normally presses the washer 15 firmly into engagement with the anchor head 10. When it is desired to clamp a license tag, for instance that marked "A," to a bracket, for instance that marked "B," the slots of the two are brought into registry and the anchor head 10 is inserted through the two slots as shown in Fig. 2. While in this position, pressure is applied to the handle member 12 so as to compress the spring and to move the anchor head to such a distance that it lies entirely beyond the far surface of the bracket. With the spring compressed and with the anchor forced inwardly to the limiting position, the member 12 is rotated through approximately 90° to simultaneously rotate the anchor head 10 and bring it to a position transversely of the slot in the bracket. By then relieving the pressure on the handle 12, the spring will firmly hold the washer 15 against the front side of the license plate and firmly hold the anchor head against the rear side of the bracket, and thereby effectively clamp the plate and bracket together.

Preferably, the anchor head is of a width slightly greater than the width of the bracket and is cut away on the side toward the bracket so that the points or extremities 16 of the anchor head may extend partially to positions above and below the bracket and in front of the rear surface of the latter so that the head can only be rotated by first pushing it rearwardly against the tension of the spring.

The position of the parts when in final clamping position is indicated in Figs. 1 and 3. Here, it will be noted that the only part visible from the front is the rather attractive or ornamental knurled head or casing 14 and the edge of the washer 15. It will be noted that there are no parts screw-threaded together which may become unscrewed and no parts which can unloosen by rattling or jarring.

In order to clamp a plate to the bracket, it is merely necessary to take the device between the thumb and finger, insert it and give it a 90° turn and the attaching operation is completed. The spring pressure will permit the plate to give to a slight extent in case sudden or unusual strain is applied thereto and thus the liability of bending, breaking or injuring the license plate or bracket is materially reduced.

It will of course be evident that the bracket and license tag taken by themselves form no portion of my invention and that any other form of tag or bracket might be employed in connection with my improved device. It will also be evident that the device itself might be used for other purposes than for securing together parts of the character shown in the drawing.

Although the device as illustrated is a preferred embodiment of my invention, yet the same results, so far as the clamping action is concerned, might be secured if the peripheral wall 14 were omitted. Under some circumstances, I might also eliminate the washer 15 and make the spring of somewhat larger diameter so that it would bear directly against the face of the number plate.

In applying the device in position, I might also, in some instances, insert it from the back so that the anchor head will come at the front of the license plate or the license plate might be placed in the rear of the transverse member of the bracket.

Having thus described my invention, what I claim as new and desire to secure by Letters Patent is:

1. A clamp for securing together a license plate and a supporting bracket, the two having registering apertures, said clamp including an anchor head adapted for insertion through said registering apertures, a shank secured to said anchor head, a coil spring encircling said shank, and means at the end of the shank opposite to said head presenting a seat for said spring.

2. A clamp for securing together two members having registering slots, said clamp including a bar or shank adapted to extend through said slots, a transverse head at one end of said bar and held against return movement through said slots after insertion and rotation of said bar, a coil spring encircling said bar and prevented from movement through said slots, and means at the opposite end of said bar for seating one end of said spring, said members being clamped between said anchor head and the opposite end of said spring.

3. A clamp holder including a shank, a cup-shaped casing rigidly secured to one end, a transverse head rigidly secured to the opposite end, and a coil spring encircling said shank and partly seated within said casing and adapted to be compressed into said casing during the insertion of said head through the part to be clamped.

4. A clamp for holding two members together including a shank, a cup-shaped casing rigidly secured to one end, a transverse head rigidly secured to the opposite end and adapted to engage with one surface of one member to be clamped, a coil spring encircling said shank and partly seated within said casing, and a washer encircling said shank between said spring and said head and adapted to engage with the opposite surface of the other member to be clamped.

5. An article of manufacture, including a shank having an anchor head integral therewith at one end and adapted to be inserted through registering apertures of two members to be clamped and a cup-shaped casing inclosing the opposite end and rigidly secured to said shank, a washer intermediate the open end of said casing and said anchor head, and a coil spring encircling said shank between said washer and the base of said casing and compressible into said casing.

Signed at Pittsburgh, in the county of Allegheny and State of Pennsylvania, this 21st day of December, A. D. 1916.

JAMES FRANK LAMBERT.

Witness:
   JNO. J. BELL.